United States Patent

Scarrah

[11] Patent Number: 6,144,885
[45] Date of Patent: Nov. 7, 2000

[54] METHOD FOR THE INTERACTIVE IMPROVEMENT OF MANUFACTURING PROCESSES

[76] Inventor: Warren P. Scarrah, 110 Graf St., Bozeman, Mont. 59715

[21] Appl. No.: 09/088,324

[22] Filed: Jun. 1, 1998

Related U.S. Application Data

[60] Provisional application No. 60/048,370, Jun. 3, 1997.

[51] Int. Cl.[7] .............................. G05B 13/02; G06F 19/00
[52] U.S. Cl. ............................................... 700/28; 700/108
[58] Field of Search .................................. 700/103, 108, 700/109, 174, 28, 31, 34, 38

[56] References Cited

U.S. PATENT DOCUMENTS

| | | | |
|---|---|---|---|
| 5,737,213 | 4/1998 | Hallwirth | 700/28 |
| 5,768,121 | 6/1998 | Federspiel | 700/42 |
| 5,781,430 | 7/1998 | Tsai | 700/28 |
| 5,812,427 | 9/1998 | Nonoyama | 702/141 |
| 5,959,861 | 9/1999 | Kaneko | 700/29 |
| 5,987,398 | 11/1999 | Halverson | 702/179 |
| 6,004,015 | 12/1999 | Watanabe | 700/28 |
| 6,009,379 | 12/1999 | Kurtzberg | 702/84 |
| 6,021,369 | 2/2000 | Kamihira | 701/102 |
| 6,047,219 | 4/2000 | Eidson | 700/2 |
| 6,055,483 | 4/2000 | Lu | 702/31 |

*Primary Examiner*—William Grant
*Assistant Examiner*—Ronald D Hartman, Jr.

[57] ABSTRACT

The invention is a manufacturing process improvement method operative in the presence of random process fluctuations with allowance made for intervention by operating personnel. The method involves following a decision tree based on a number of heuristics. The effects of all process variables are evaluated in a phase in which each variable is perturbed separately to identify small, if any, effects on process responses. A sequence of phases progresses toward improved operating conditions. Reliance on small effects avoids severe process disruptions and leads to the incorporation of favorable variable interactions. Replications of variable perturbations and statistical analysis are used to identify small effects that coexist with random process fluctuations.

2 Claims, 1 Drawing Sheet

METHOD FOR THE INTERACTIVE IMPROVEMENT OF MANUFACTURING PROCESSES

This application claims the benefit of U.S. Provisional Application No. 60/048,370, filed on Jun. 3, 1997.

BACKGROUND—FIELD OF INVENTION

This invention relates to physical and chemical manufacturing processes, and in particular to a method for improving large-scale processes.

BACKGROUND—DESCRIPTION OF PRIOR ART

Process improvement requires that operating variables must be adjusted (perturbed) to different values (levels) and the resulting effects on the process be evaluated. Methods for improving large-scale processes should (1) satisfy the concerns of operating personnel, (2) avoid excessive process disruptions, and (3) provide guidance for directing the progression of the study. Past methods have failed to satisfy one or more of these characteristics.

Operating Personnel. Effective process improvement requires that any plan not interfere with the ability of operating personnel to control their process. They also prefer that any process changes demonstrate a transparent and timely relationship between variable perturbations and resultant effects on the process and/or product. Most process improvement methods use a multivariable approach consisting of a set of experimental runs in which all the variables are simultaneously perturbed to different levels in each run. The set of runs is selected to satisfy an improvement plan (design or algorithm) that may lead to very uncertain results because of these multiple perturbations. A major disadvantage of many multivariable methods is that the completion of the improvement plan sometimes leads to excessive process disruptions; it may even be prudent in some instances to discontinue the plan. A second major disadvantage is that there is no immediate observation of the effects on the process and/or product responses of the variable perturbations. In some methods the effects of individual variables can never be identified while in other methods the analysis capable of separating individual variable effects cannot be accomplished until the entire set of experimental runs has been completed.

Process Disruptions—Experimental Designs. Excessive process disruptions usually result in economic penalties due to the creation of non-usable product or adverse effects on the operation of the processing facilities. Experimental designs can be used to confine process and/or product changes to tolerable levels. By replicating experimental runs, they allow the use of statistics to evaluate the effects of small variable perturbations in the presence of random process fluctuations (noise). Multivariable experimental designs are rigorously structured so that the required set of experimental runs will provide a reliable statistical analysis. The foremost disadvantages of multivariable experimental designs are that (1) no systematic approach is suggested for guiding the progression of the study, (2) the effects of individual variables cannot be separated until the entire design has been completed, (3) the number of runs increases significantly for each added variable, (4) it is seldom possible to include variables that have only discrete rather than continuous values, and (5) it is sometimes physically impossible to adjust the process so that the required levels of all variables can be simultaneously satisfied.

Guidance—Optimization Methods. Competent guidance should steer the selection of the size and direction of variable perturbations and insure that the benefits of favorable variable interactions are realized. Optimization methods have been developed to satisfy guidance requirements and quickly improve the process. The principal disadvantage of optimization methods is due to the emphasis on rapid improvement; the need for replications is avoided by allowing large process and/or product deviations so that random process fluctuation can be neglected—this usually results in unacceptable process disruptions. Because practically all optimization methods use a multivariable approach, additional significant disadvantages include (1) not being able to identify the effects of individual variables, (2) the general inability to handle discrete-valued variables, (3) the occasional impossibility of simultaneously setting all variable levels at their required levels, and (4) the difficulty in adding a new variable into an ongoing optimization study.

Prior Art. In order to provide background information so that the invention may be completely understood and appreciated in its proper context, reference is made to a number of prior publications as follows: Box, G. E. P., "Evolutionary Operation: a Method for Increasing Industrial Productivity," *Applied Statistics,* Vol. VI, No. 2, pp. 81–101 (1957); Spendley, W., G. R. Hext, and F. R. Himsworth, "Sequential Application of Simplex Designs in Optimisation and Evolutionary Operation," *Technometrics,* Vol. 4, No. 4, pp. 441–461(1962); Lowe, C. W., "Some Techniques of Evolutionary Operation," *Transactions of the Institution of Chemical Engineering,* Vol. 42, pp. T334–T344 (1964); Hooke, R, and T. A. Jeeves, "'Direct Search' Solution of Numerical and Statistical Problems," *Journal of the Association for Computer Machinery,* Vol. 8, No. 2, pp.212–229 (1961); and Himmelblau, D. M., "Process Analysis by Statistical Methods," John Wiley and Sons, New York, p.260 (1970).

In the 1957 article by Box, the term evolutionary operation was used to describe his process improvement method based on factorial experimental designs. Since then evolutionary operation (EVOP) has become a generic term referring to methods suitable for improving manufacturing processes. In factorial EVOP a center point is added to the standard factorial designs to provide a measure of curvature; the entire design is replicated 7–10 times. Because of the large number of experimental runs it is recommended that no more than three variables be included in a study. Although factorial EVOP suffers from all of the previously-mentioned disadvantages of experimental designs it is especially deficient in not providing guidance for the progression of the improvement study.

The sequential adaptation of EVOP was discussed in the 1962 article by Spendley, Hext, and Himsworth. To avoid confusing the totally-different Simplex linear programming method with the sequential simplex method, a number of different names have been used to distinguish the latter: simplex EVOP, rotating-simplex method of optimization, self-directing optimization (SDO), simplex self-directing (SSD), the simplicial method, and simplex search ($S^2$). This multivariable method relies on a pattern (simplex) of experimental runs—there is one more run in the simplex than the number of variables being considered. The simplex progresses by "flip-flopping," i.e., rejecting the run with the poorest process response and reflecting the simplex in the direction opposite the rejected run. Originally the size of the simplex was held constant, but subsequent modifications provide for its expansion and contraction. Justification for not replicating experimental runs is based on fewer experiments being required for a high rate of progress than for reducing erroneous decisions by replication—the operating problems that would result from excessive process disruptions are not considered. The sequential simplex method has all the disadvantages previously identified with optimization methods and is especially prone to lead to severe process disruptions.

An EVOP adaptation called rotating squares evolutionary operation (ROVOP) was discussed in Lowe's 1964 article. ROVOP is similar to factorial EVOP except that a sequence of increasingly-larger factorial designs is centered on the starting operating conditions; each subsequent factorial design is then rotated 45°. The number of experimental runs is significantly greater than for factorial EVOP, but the additional data can be used to generate a mathematical model of the process. Computer calculations can be made using the model to guide the selection of new operating conditions. ROVOP has all the disadvantages already identified with factorial EVOP except that it is not difficult to add additional variables.

The random evolutionary operation (REVOP) adaptation was also discussed in Lowe's 1964 article. The intent in developing this multivariable method was to be able to investigate a large number of variables at one time. The levels for each variable are randomly perturbed; if the process response improves the perturbations are repeated but if it diminishes another set of perturbations are randomly selected. REVOP might be classified as an optimization method but it relies mostly on chance to guide the direction of the study. It also has all the previously-mentioned disadvantages associated with optimization methods.

A one-variable-at-a-time optimization method was presented in the 1961 article by Hooke and Jeeves. It was developed in the context of optimizing error-free mathematical functions. A single variable is perturbed in one direction and, if the process response improves, the variable level is changed to the perturbed value. Otherwise, it is perturbed in the opposite direction and, again, no change in the variable level is made unless the response is improved. Each variable is perturbed in sequence. After all variables have been considered, the levels of all are simultaneously changed in the directions that have shown improvement and the procedure started again. Himmelblau suggested in his 1970 book that this method could be adopted for process optimization by experimentation. However, the Hooke-Jeeves method still has the major disadvantage of relying on large process and/or product deviations.

Whatever the precise merits, features and advantages of the above cited references, none of them achieves or fulfills the purposes of the interactive process improvement method of the present invention.

OBJECTS AND ADVANTAGES

Accordingly, several objects and advantages of the present invention are:

(a) to provide a manufacturing process improvement method that is operative in the presence of random process fluctuations;

(b) to provide a manufacturing process improvement method that can be interactively altered by operating personnel to remedy detrimental process and/or product effects;

(c) to provide a manufacturing process improvement method in which variable perturbations can be kept small enough to avoid excessive process and/or product disruptions;

(d) to provide a manufacturing process improvement method in which the effects on the process and/or product responses are directly related to the perturbation of each variable;

(e) to provide a manufacturing process improvement method that does not require combinations of variable levels that are physically impossible or unreasonably difficult to attain;

(f) to provide a manufacturing process improvement method that is not limited to investigating the effects of only a small number of variables;

(g) to provide a manufacturing process improvement method that is suitable for use with both continuous-valued and discrete-valued variables;

(h) to provide a manufacturing process improvement method in which variables can easily be added or deleted during the course of the study;

(i) to provide a manufacturing process improvement method that will systematically guide the progression of the study by recommending the size and direction of variable perturbations;

(j) to provide a manufacturing process improvement method that will automatically incorporate favorable variable interactions.

Further objects and advantages of the present invention will become apparent from a consideration of the drawings and ensuing description.

SUMMARY OF THE INVENTION

The present invention, singular evolutionary operation, is a process improvement method that is operative in the presence of random process fluctuations. It includes both an experimental design and an optimization method. Only one variable at a time is considered. The simple experimental design consists of a cycle of replicate pairs of process response measurements at both the reference (normal) and an exploratory level of one variable. The significance of the process response change is evaluated using the standard statistical analysis for paired observations. The optimization method consists of a series of successive phases based on heuristics. In each phase all the variables are investigated one at a time. A variable may undergo as few as one or as many as four cycles within a phase. Multiple cycles for a variable would involve changes in the size and/or direction of the perturbation used to select the exploratory level. The size of a variable perturbation can increase, remain constant, or decrease depending on (1) its effect on the process response and (2) the existence of variable constraints. Each variable progresses through a series of classifications associated with one of three stages: expansion stage, moderation stage, and contraction stage. Each stage has its own set of heuristics for selecting variable perturbations. Additional heuristics (1) direct the transfer of variables between the classifications, (2) provide the opportunity for an operator to exercise judgment and alter perturbation heuristics, and (3) suggest when the study should be terminated. The consequences of this approach are that within a phase each variable is separately investigated and undergoes a small, if any, change in its level. As the process incorporates these small changes into its operation it realizes the effects of favorable variable interactions.

DESCRIPTION OF PREFERRED EMBODIMENT—FIG. 1

Figure 1:
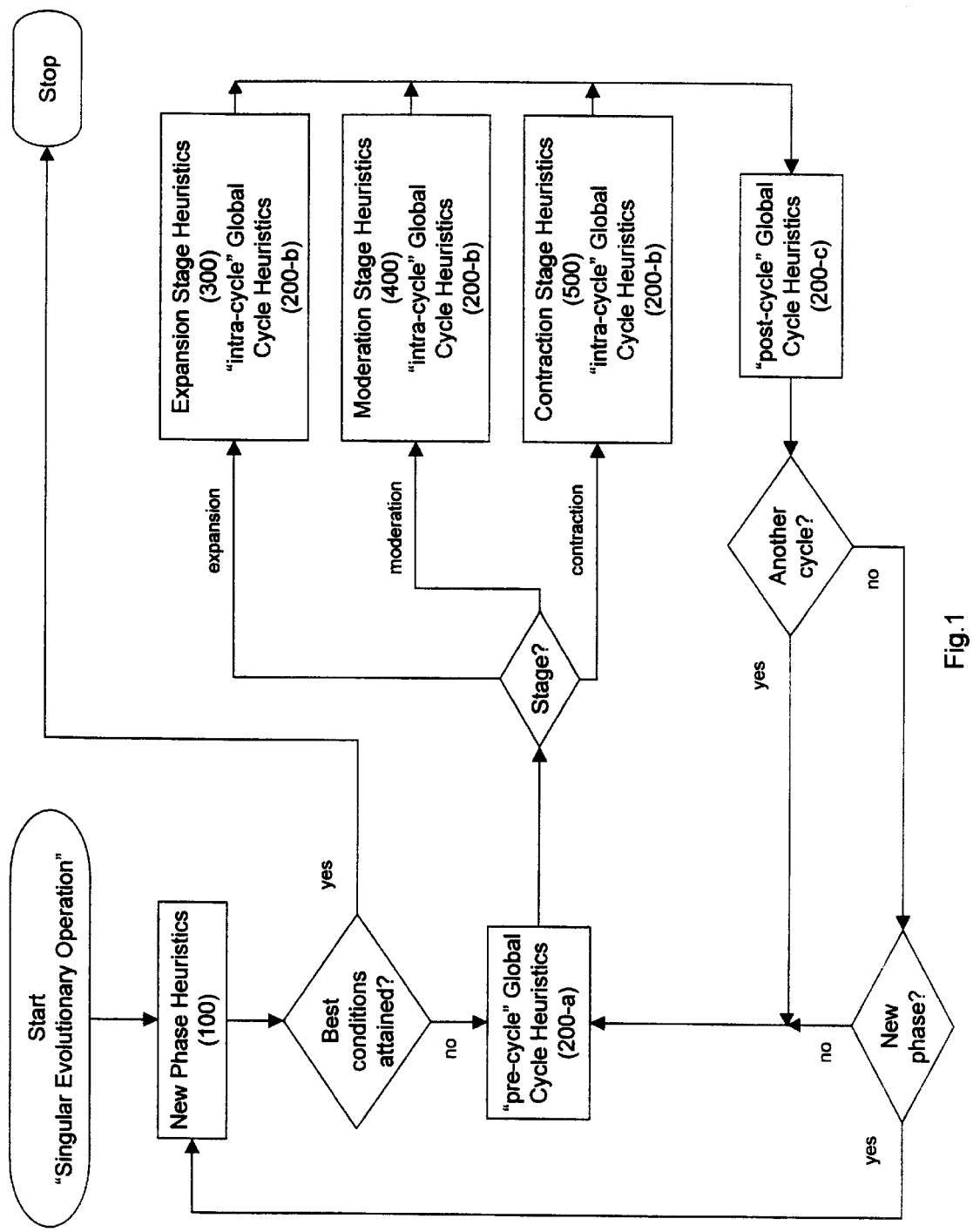
FIG. 1 is a flowchart for the preferred embodiment.

Definitions. Before beginning the description of the method, it will be helpful to provide the following definitions:

(a) Perturbation: A perturbation refers to the difference (size and direction) between the reference level of a variable and its exploratory level.
(b) Cycle: A cycle consists of all the replications of a single pair of reference and exploratory levels for one variable.
(c) Phase: A phase describes a complete sequence in which all the variables under investigation are considered. Although each variable is considered only once during the phase, up to four cycles may be required for each variable.
(d) Stage: The parameters of a variable perturbation are its size and direction. These parameters are adjusted by incorporating the past effects of each variable on the process responses. Three different stages (expansion, moderation, and contraction) have been developed to select these parameters.
(e) Variable Classification: The stage to which a variable belongs is indicated by a classification identifier.
(f) Unrestricted Variable (X and MX classifications): A variable for which perturbations can be made in both the positive and the negative directions is termed an unrestricted variable. An unrestricted variable is found only in the expansion stage.
(g) Bounded Variable (X−, MX−, X+, and MX+ classifications): A variable is bounded when perturbations can be made in only one direction. If the bound was caused by a decrease in the level of the variable, a lower bound on the variable will have been established. Likewise, if the bound was caused by an increase in the level of the variable, an upper bound will have been established. A bounded variable is found only in the expansion stage.
(h) Enclosed Variable (M classification): A variable is enclosed when both a lower and an upper bound have been established. Although the variable becomes enclosed in the expansion stage, an enclosed variable is found only in the moderation stage.
(i) Contraction Variable (C classification): A variable for which the size of the perturbation is still being reduced. A contraction variable is found only in the contraction stage.
(j) Non-active Variable (NA classification): A variable for which the size of the perturbation has been reduced and no further size reduction will be made. A non-active variable is found only in the contraction stage.
(k) Initial Perturbation: An initial perturbation refers to the perturbation used during the first cycle after (1) a variable is originally introduced into a singular evolutionary operation study, (2) a variable is transferred to the moderation stage, or (3) a variable is transferred to the contraction stage.
(l) Variable Constraint: Process or product considerations may constrain or limit the allowable levels at which a variable may operate.

Heuristics. The preferred embodiment of the singular evolutionary operation method for improving physical and chemical manufacturing processes will now be described. As shown in FIG. 1, the heuristics are separated into five categories:

1. new phase heuristics
2. global cycle heuristics
3. expansion stage heuristics
4. moderation stage heuristics
5. contraction stage heuristics 1. New Phase Heuristics—FIG. 1(100)

The phase heuristics are used (1) to select the variables to be considered, (2) to handle weak variables, (3) to handle discrete-valued variables, (4) to recommend the initial variable perturbations, (5) to select the statistical significance level and replications, (6) to determine the appropriate time to transfer all the variables to the contraction stage and the perturbations to be used, (7) to recognize whether the best operating conditions have been identified, and (8) to select the sequence in which the variables are to be studied.

heuristic 102—selection of variables
It is preferable to identify the variables to be studied prior to starting a phase. This is the most appropriate time to add or delete variables for study.

heuristic 104—weak variables
If a variable has shown no significant effect after several consecutive phases, it may be wise to drop that variable from consideration or to intermittently reintroduce it in subsequent phases. A practical, but by no means exclusive, number of consecutive phases that a variable has shown no significant effect has been found to be four.

heuristic 106—discrete-valued variables
Because variables with only discrete levels often are effective under rather specific conditions, it may be wise to include them in every phase.

heuristic 108—initial variable perturbations
Every initial variable perturbation size and direction should be based on existing process knowledge whenever possible. Caution should be exercised if intuition must be relied upon to select the initial perturbation.

heuristic 110—statistical significance level and replications
Select the significance level to be used to determine if a process response resulting from a variable perturbation is significant using the standard statistical analysis for paired observations. The number of replications within a cycle is related to the significance level—as the significance level increases the number of replications also increases. A practical, but by no means exclusive, combination of significance level and replications has been found to be a significance level of 90% with seven replications.

heuristic 112—transfer of all variables from the moderation stage to the contraction stage due to constant reference levels
If all the variables (1) have remained in the moderation stage and (2) had no reference level change for several consecutive phases, all variables will be simultaneously transferred to the contraction stage and their classifications change to C. A practical, but by no means exclusive, number of consecutive phases without a reference level change has been found to be two.

heuristic 114—transfer of all the variables from a combination of the moderation stage and the expansion stage to the contraction stage due to constant reference levels
If (1) all the variables have been transferred to the moderation stage at least once and (2) the reference levels of all variables have not changed for several consecutive phases (regardless of whether they are currently in the expansion stage or moderation stage), all variables will be simultaneously transferred to the contraction stage and their classifications changed to C. A practical, but by no means exclusive, number of consecutive phases without a reference level change has been found to be three.

heuristic 116—transfer of all the variables to the contraction stage after oscillating reference levels have been observed If (1) all the variables have been transferred to the moderation stage at least once and (2) the reference points of some of the variables have ceased to change while others consistently oscillate between several reference levels, it may be prudent to simultaneously transfer all variables to the contraction stage and change their classifications to C.

heuristic 118—reduced stage transfer perturbation size and direction for the initial contraction stage cycle The variable perturbation size will be reduced from that of the previous phase for the initial cycle after a variable is transferred into the contraction stage. The direction will be that showing the largest improvement or least diminution in the previous phase. A practical, but by no means exclusive, perturbation size reduction has been found to be 50%.

heuristic 120—recognition that the best operating conditions have been reached

After all the variables have been classified NA, the current best operating conditions have been identified as well as possible using singular evolutionary operation.

heuristic 122—variable sequence

The order in which the variables will be considered should be randomly selected whenever possible.

heuristic 124—sequencing combinations of expansion stage and moderation stage variables Expansion stage variables (X, X-, X+, MX, MX-, MX+) should be considered before moderation stage variables (M).

heuristic 126—sequencing contraction stage variables

Consider those variables (C) for which the perturbation size is still being reduced before those variables (NA) for which no further size reduction will be made.

2. Global Cycle Heuristics—FIG. 1(200)

These heuristics are considered to be "global" because they are applicable to any cycle within a phase. Pre-cycle heuristics are used (1) to avoid violations of variable constraints and (2) to provide the opportunity for personnel to exercise judgment to supersede perturbation heuristics. During a cycle the intra-cycle heuristic can be activated to allow personnel to interrupt the study and adjust the perturbation if the process is being disrupted. The post-cycle heuristics are used (1) to change the level of a variable, stop its study within a phase, and recommend the same perturbation size and direction for the next phase; (2) to indicate when to perturb the variable in the opposite direction; (3) to identify the preferred perturbation direction when neither has resulted in a significant improvement; and (4) to adjust a perturbation for the next phase if the effect has been judged to be excessive.

Pre-cycle—FIG. 1(200-a)

heuristic 202—variable constraints

If a perturbation size is such that it will violate a variable constraint, the variable will be considered bounded at the associated reference level of the variable. No perturbations will be made that would violate a variable constraint.

heuristic 204—override of variable perturbation

If the judgment of personnel indicates that the anticipated consequences of a variable perturbation (size and/or direction) may be too uncertain or possibly unacceptable, the perturbation can be adjusted.

Intra-cycle—FIG. 1(200-b)

heuristic 212—cycle interruption

If detrimental process effects are observed during a cycle, personnel may stop the cycle and adjust the perturbation.

Post-cycle—FIG. 1(200-c)

heuristic 222—change of variable reference level

The reference level of a variable will be changed to the exploratory level only if the cycle has achieved a significant process improvement.

heuristic 224—effect of a change in variable reference level

After a change in a variable reference level to the exploratory level, no further cycles will be run using that variable until the next phase.

heuristic 226—retaining a variable perturbation for the next phase due to a significant improvement The variable perturbation (size and direction) will be retained for the next phase whenever a significant improvement has been realized heuristic 228—opposite variable perturbation direction If the perturbation of a variable in the first direction does not realize a significant improvement, explore a second perturbation of the same size but in the opposite direction unless the variable is bounded.

heuristic 230—best variable perturbation direction

The best variable perturbation direction will be that having the largest improvement or least diminution after the variable has been studied in the current phase.

heuristic 232—excessive process responses

Whenever a variable perturbation has an excessive effect on the process response, the variable perturbation size for the next phase will be reduced (even if the effect was an improvement). A practical, but by no means exclusive, measure of an excessive effect has been found to be when the statistical analysis variable effect: error limit ratio exceeds 3:1.

3. Expansion Stage Heuristics—FIG. 1(300)

It is important to approximate the bounds within which the level of a variable can fluctuate without significantly diminishing the process response. At the beginning of a singular evolutionary operation investigation, it is usually assumed that a variable can be perturbed in either direction, i.e., its value can both decrease and increase. It is also likely that the largest changes in a variable's level will occur early in an investigation because (1) process changes that normally evolve have not been thoroughly evaluated or (2) variable interactions have not been explored. Provision is made to transfer a variable forward to the "moderation" stage after it has been enclosed. The defining characteristic of the expansion stage is that the size of the perturbation can be increased in one or both directions. Expansion stage heuristics are used (1) to increase the perturbation size one time within a phase if necessary, (2) to increase the perturbation size again for the next phase if necessary, and (3) identify when variables are bounded and enclosed and the actions to be taken.

The following variable classifications are used in the expansion stage:

X identifies a variable that has neither a lower or upper bound

X- identifies a variable for which an upper bound has been found, i.e., perturbations can only be made in the direction of decreasing values of the variable X+ identifies a variable for which a lower bound has been found, i.e., perturbations can only be made in the direction of increasing values of the variable MX identifies a variable that has neither a lower or upper bound that has been transferred back from the moderation stage MX− identifies a variable for which an upper bound has been found and that has been transferred back from the moderation stage MX+ identifies a variable for which a lower bound has been found and that has been transferred back from the moderation stage heuristic 302—expanded inter-cycle perturbation size If no significant improvement is realized after the first search of all allowable directions, a second, expanded perturbation size will be used within a phase. A practical, but by no means exclusive, inter-cycle perturbation size expansion has been found to be 50% of the first perturbation size.

heuristic 304—expanded inter-phase perturbation size

If no significant improvement is realized after searching all allowable directions using two perturbation sizes within a phase, the perturbation size will be expanded for the next phase. A practical, but by no means exclusive, inter-phase perturbation size expansion has been found to be 100% of the first perturbation for the current phase.

heuristic 306—variable bounding due to diminished process response

If the process response is significantly diminished, the variable will be considered bounded at the associated reference level. No further perturbations will be made in that direction as long as the variable remains in the expansion stage. The variable classification will be changed to X−, X+, MX−, or MX+ as appropriate to indicate it is now bounded.

heuristic 308—variable enclosing due to second variable bound

After a second variable bound has been identified, the variable will be transferred to the moderation stage and exploration will be stopped for that phase if at least one complete cycle has been completed. The variable classification will be changed to M to indicate it has become enclosed.

4. Moderation Stage Heuristics—FIG. 1(400)

After a variable has been enclosed, the range between the lower and upper bounds may be quite broad. The purpose of this stage is to identify a smaller range that will include the best process response. Because of variable interactions, the allowable range of a variable may change—provision is made to transfer the variable back to the "expansion" stage if appropriate. The defining characteristic of the moderation stage is that a single, conservatively-sized perturbation is used in one or both directions. The moderation stage heuristics are used (1) to select the initial moderation stage perturbation, (2) to maintain a conservatively-sized perturbation for use within the variable bounds, and, when appropriate, (3) to transfer a variable back to the expansion stage with an increased perturbation size.

The following variable classification is used in the moderation stage:

M identifies a variable in the moderation stage heuristic 402—constant variable perturbation size The perturbation size will remain constant as long as the variable remains in the moderation stage unless it has an excessive effect on the process response.

heuristic 404—reduced stage transfer perturbation size for the initial moderation stage cycle The size of the first variable perturbation for the initial phase after being transferred to the moderation stage will be reduced from the perturbation size being used when the variable became enclosed. A practical, but by no means exclusive, perturbation size reduction has been found to be 50%.

heuristic 406—initial moderation stage variable perturbation direction

The direction of the first variable perturbation for the initial phase after being transferred to the moderation stage will be the same as that being followed when the variable became enclosed.

heuristic 408—transfer of a variable back to the expansion stage

If no significant process response (improvement or diminution) is realized after perturbations in both directions, the variable will be transferred back to the expansion stage and its classification changed to MX.

heuristic 410—expanded inter-phase perturbation size due to transfer from the moderation back to the expansion stage When a variable is transferred from the moderation stage back to the expansion stage, the perturbation size will be expanded for the next phase. If the expanded perturbation size would violate a variable constraint, use a smaller expansion size that will just extend to the constraint. A practical, but by no means exclusive, inter-phase perturbation size expansion has been found to be a 50% expansion of the moderation stage perturbation size.

5. Contraction Stage Heuristics—FIG. 1(500)

This is the "fine-tuning" stage used to find the best levels for each variable. The defining characteristic of this stage is that the size of the variable perturbation can be reduced in one or both directions. The perturbation size of each variable will be reduced at least twice from that used in the "moderation" stage with additional reductions possible when appropriate. The contraction stage heuristics (1) allow the perturbation size to be reduced for "fine-tuning" the variable level and (2) indicate when the perturbations are no longer significantly affecting the process response.

The following variable classifications are used in the moderation stage:

C identifies a variable for which a reduction in the size of the perturbation is still being considered NA identifies a variable for which no further changes in the size of the perturbation are being considered heuristic 502—reduced inter-phase perturbation size If no significant improvement is realized after searching all allowable directions, the perturbation size will be reduced for the next phase unless the variable has been reclassified as non-active (NA). A practical, but by no means exclusive, perturbation size reduction has been found to be 50%.

heuristic 504—reclassification of a variable as non-active

If the reference level has not changed for several consecutive phases, a variable will be reclassified as non-active (NA) and no additional reductions will be made in the perturbation size. A practical, but by no means exclusive, number of consecutive phases has been found to be two.

Operation of Preferred Embodiment—FIG. 1

The heuristics presented in the preceding "Description of Preferred Embodiment" section form the foundation of singular evolutionary operation. The preferred embodiment of the method for applying these heuristics is through the use of a decision tree. The decision tree organizes all of the heuristics into a format so that they can be implemented. The decision strategy presented below is one of many different decision strategies that could be generated. Refer now to the FIG. 1 flowchart for the preferred embodiment.

Decision Tree. A decimal system is used to represent the sequence in which the branches (decisions and actions) on the decision tree are to be considered. To simplify the representation, each branch contains a brief description and most end with one or more three-digit numbers enclosed by parentheses. Each three-digit number is the label for a particular heuristic to be invoked. The details concerning the heuristic can be found by referring to the corresponding label in the "Description of Preferred Embodiment." The overall plan is that initially there are a number of decisions that should be made before starting a new phase to investigate the effects of the variables on the process. Next, because multiple cycles are possible for each variable within a phase, there are several more decisions to be made prior to starting each cycle. Finally, after a cycle has been started, there are more decisions to be made within and at the completion of the cycle. Some of these decisions are independent of the stage in which the variable is classified—the appropriate heuristics were previously identified as intra-cycle and post-cycle global heuristics. However, most cycle decisions depend on the stage to which the variable belongs. Therefore, the starting classification of the variable determines which branches of the decision tree can be used to make decisions for that particular variable. Some root numbers on the decision tree that may aid in its interpretation are:

1. new phase issues
2. pre-cycle issues
3. variable classifications
3.1. X or MX variables
3.2. X−, MX−, X+, or MX+ variables
3.3. M variables
3.4. C variables
3.5. NA variables A decision-tree representation of the singular evolutionary operation decision strategy is:
1. NEW PHASE?
1.1 yes:
1.1.1 consider termination of process improvement study (120)
1.1.1.1 yes:
 stop study—best operating conditions have been identified
1.1.1.2 no:
1.1.1.2.1 select statistical significance level and replications (110)
 continue
1.1.1.2.2 generate list of potential variables (102)
 review weak variables (104)
 review discrete-valued variables (106)
 continue
1.1.1.2.3 select initial perturbations (108)
 continue
1.1.1.2.4 consider initiation of contraction stage (112,114, 116)
1.1.1.2.4.1 yes:
 select initial contraction stage perturbations—reduced stage transfer sizes and best directions (118)
 determine variable sequence (122,124,126)
 go to 2. (NEW CYCLE?)
1.1.1.2.4.2 no:
 determine variable sequence (122,124,126)
 go to 2. (NEW CYCLE?)
1.2 no:
 continue
2. NEW CYCLE?
2.1 yes:
2.1.1 reconcile variable constraints/perturbations (202)
 continue
2.1.2 modify uncertain/unacceptable perturbations (204)
 go to 3. VARIABLE CLASSIFICATION?
2.2 no:
 continue
3. VARIABLE CLASSIFICATION?
3.1 X or MX:
 intra-cycle process/product disruption review (212)
 RESULT?
3.1.1 improvement:
 change reference level (222)
 pre-select perturbation for next phase—same size and same direction (226)
 resolve excessive process response issue (232)
 go to next variable (224)
3.1.2 diminution:
 characterize variable as "bounded variable" (306)
 reclassify variable X−, MX−, X+, or MX+ (as appropriate) (306)
 select new perturbation (2nd)—same size and opposite direction (228)
 resolve excessive process response issue (232)
 intra-cycle process/product disruption review (212)
 RESULT?
3.1.2.1 improvement:
 change reference level (222)
 pre-select perturbation for next phase—same size and same direction (226)
 resolve excessive process response issue (232)
 go to next variable (224)
3.1.2.2 diminution:
 characterize variable as "enclosed variable" (308)
 reclassify variable M (308)
 pre-select perturbation for next phase—reduced stage transfer size and same direction (404,406)
 resolve excessive process response issue (232)
 go to next variable
3.1.2.3 not significant:
 select new perturbation (3rd)—expanded inter-cycle size and same direction (302,306)
 intra-cycle process/product disruption review (212)
 RESULT?
3.1.2.3.1 improvement:
 change reference level (222)
 pre-select perturbation for next phase—same size and same direction (226)
 resolve excessive process response issue (232)
 go to next variable (224)
3.1.2.3.2 diminution:
 characterize variable as "enclosed variable" (308)
 reclassify variable M (308)
 pre-select perturbation for next phase—reduced stage transfer size and same direction (404,406)

resolve excessive process response issue (232)
go to next variable
3.1.2.3.3 not significant:
  pre-select perturbation for next phase—expanded inter-phase size and same direction (304,306)
  go to next variable
3.1.3 not significant:
  select new perturbation (2nd)—same size and opposite direction (228)
  intra-cycle process/product disruption review (212)
  RESULT?
3.1.3.1 improvement:
  change reference level (222)
  pre-select perturbation for next phase—same size and same direction (226)
  resolve excessive process response issue (232)
  go to next variable (224)
3.1.3.2 diminution:
  characterize variable as "bounded variable" (306)
  reclassify variable X−, MX−, X+, or MX+ (as appropriate) (306)
  select new perturbation (3rd)—expanded inter-cycle size and opposite direction (302)
  resolve excessive process response issue (232)
  intra-cycle process/product disruption review (212)
  RESULT?
3.1.3.2.1 improvement:
  change reference level (222)
  pre-select perturbation for next phase—same size and same direction (226)
  resolve excessive process response issue (232)
  go to next variable (224)
3.1.3.2.2 diminution:
  characterize variable as "enclosed variable" (308)
  reclassify variable M (308)
  pre-select perturbation for next phase—reduced stage transfer size and same direction (404,406)
  resolve excessive process response issue (232)
  go to next variable
3.1.3.2.3 not significant:
  pre-select perturbation for next phase—expanded inter-phase size and same direction (304,306)
  go to next variable
3.1.3.3 not significant:
  select new perturbation (3rd)—expanded inter-cycle size and best direction (302,230)
  intra-cycle process/product disruption review (212)
  RESULT?
3.1.3.3.1 improvement:
  change reference level (222)
  pre-select perturbation for next phase—same size and same direction (226)
  resolve excessive process response issue (232)
  go to next variable (224)
3.1.3.3.2 diminution:
  characterize variable as "bounded variable" (306)
  reclassify variable as X−, MX−, X+, or MX+ (as appropriate) (306)
  select new perturbation (4th)—same size and opposite direction (228)
  resolve excessive process response issue (232)
  intra-cycle process/product disruption review (212)
  RESULT?
3.1.3.3.2.1 improvement:
  change reference level (222)
  pre-select perturbation for next phase—same size and same direction (226)
  resolve excessive process response issue (232)
  go to next variable (224)
3.1.3.3.2.2 diminution:
  characterize variable as "enclosed variable" (308)
  reclassify variable M (308)
  pre-select perturbation for next phase—reduced stage transfer size and same direction (404,406)
  resolve excessive process response issue (232)
  go to next variable
3.1.3.3.2.3 not significant:
  pre-select perturbation for next phase—expanded inter-phase size and same direction (304,306)
  go to next variable
3.1.3.3.3 not significant:
  select new perturbation (4th)—same size and opposite direction (228)
  intra-cycle process/product disruption review (212)
  RESULT?
3.1.3.3.3.1 improvement:
  change reference level (222)
  pre-select perturbation for next phase—same size and same direction (226)
  resolve excessive process response issue (232)
  go to next variable (224)
3.1.3.3.3.2 diminution:
  characterize variable as "bounded variable" (306)
  reclassify variable as X−, MX−, X+, or MX+ (as appropriate) (306)
  pre-select perturbation for next phase—expanded inter-phase size and opposite direction (304,306)
  resolve excessive process response issue (232)
  go to next variable
3.1.3.3.3.3 not significant:
  pre-select perturbation size for next phase—expanded inter-phase size
  and best direction (304,230)
  go to next variable
3.2. X−, MX−, X+, or MX+:
  intra-cycle process/product disruption review (212)
  RESULT?
3.2.1 improvement:
  change reference level (222)
  pre-select perturbation for next phase—same size and same direction (226)
  resolve excessive process response issue (232)
  go to next variable (224)
3.2.2 diminution:
  characterize variable as "enclosed variable" (308)
  reclassify variable M (308)
  pre-select perturbation for next phase—reduced stage transfer size and same direction (404,406)
  resolve excessive process response issue (232)
  go to next variable 3.2.3 not significant:
  select new perturbation (2nd)—expanded inter-cycle size and same direction (302,306)
  intra-cycle process/product disruption review (212) RESULT?
3.2.3.1 improvement:
  change reference level (222)
  pre-select perturbation for next phase—same size and same direction (226)
  resolve excessive process response issue (232)
  go to next variable (224)
3.2.3.2 diminution:
  characterize variable as "enclosed variable" (308)
  reclassify variable M (308)
  pre-select perturbation for next phase—reduced stage transfer size and same direction (404,406)
  resolve excessive process response issue (232)
  go to next variable
3.2.3.3 not significant:
  pre-select perturbation for next phase—expanded inter-phase size and same direction (304,306)
  go to next variable
3.3. M:
  intra-cycle process/product disruption review (212) RESULT?
3.3.1 improvement:
  change reference level (222)
  pre-select perturbation for next phase—same size and same direction (226)
  resolve excessive process response issue (232)
  go to next variable (224)
3.3.2 diminution:
  PERTURBATION ALLOWABLE IN OPPOSITE DIRECTION (WILL NOT VIOLATE A VARIABLE CONSTRAINT)?
3.3.2.1 yes:
  select new perturbation (2nd)—same size and opposite direction (402,228)
  intra-cycle process/product disruption review (212)
  resolve excessive process response issue (232)
  RESULT?
3.3.2.1.1 improvement:
  change reference level (222)
  pre-select perturbation for next phase—same size and same direction (226)
  resolve excessive process response issue (232)
  go to next variable (224)
3.3.2.1.2 diminution:
  pre-select perturbation for next phase—same size and best direction (402,230)
  resolve excessive process response issue (232)
  go to next variable
3.3.2.1.3 not significant:
  pre-select perturbation for next phase—same size and best direction (402,230)
  go to next variable
3.3.2.2 no:
  pre-select perturbation for next phase—same size and same direction (402,202)
  resolve excessive process response issue (232)
  go to next variable
3.3.3 not significant:
  PERTURBATION ALLOWABLE IN OPPOSITE DIRECTION (WILL NOT VIOLATE A VARIABLE CONSTRAINT)?
3.3.3.1 yes:
  select new perturbation (2nd)—same size and opposite direction (402,228)
  intra-cycle process/product disruption review (212) RESULT?
3.3.3.1.1 improvement:
  change reference level (222)
  pre-select perturbation for next phase—same size and same direction (226)
  resolve excessive process response issue (232)
  go to next variable (224)
3.3.3.1.2 diminution:
  pre-select perturbation for next phase—same size and best direction (402,230)
  resolve excessive process response issue (232)
  go to next variable
3.3.3.1.3 not significant
  characterize variable as "unrestricted variable" (408)
  reclassify variable as MX (408)
  pre-select perturbation for next phase—expanded stage transfer size and best direction (410,230)
  go to next variable
3.3.3.2 no:
  pre-select perturbation for next phase—same size and same direction (402,202)
  go to next variable
3.4 C:
  intra-cycle process/product disruption review (212) RESULT?
3.4.1 improvement:
  change reference level (222)
  pre-select perturbation for next phase—same size and same direction (226)
  resolve excessive process response issue (232)
  go to next variable (224)
3.4.2 diminution or not significant:
  PERTURBATION ALLOWABLE IN OPPOSITE DIRECTION (WILL NOT VIOLATE A VARIABLE CONSTRAINT)?
3.4.2.1 yes:
  select a new perturbation (2nd)—same size and opposite direction (228)
  resolve excessive process response issue (232)
  intra-cycle process/product disruption review (212) RESULT?
3.4.2.1.1 improvement:
  change reference level (222)
  pre-select perturbation for next phase—same size and same direction (226)
  resolve excessive process response issue (232)
  go to next variable (224)
3.4.2.1.2 diminution or not significant:
  SEVERAL CONSECUTIVE PERTURBATION SIZE REDUCTIONS?

3.4.2.1.2.1 yes:
  characterize variable as "non-active variable" (504)
  reclassify variable NA (504)
  pre-select perturbation for next phase—same size and best direction (502,230)
  resolve excessive process response issue (232)
  go to next variable
3.4.2.1.2.2 no:
  pre-select perturbation for next phase—reduced inter-phase size and best direction (502,230)
  resolve excessive process response issue (232)
  go to next variable
3.4.2.2 no:
  SEVERAL CONSECUTIVE PERTURBATION SIZE REDUCTIONS?
3.4.2.2.1 yes:
  characterize variable as "non-active variable" (504)
  reclassify variable NA (504)
  pre-select perturbation for next phase—same size and same direction (502,202)
  resolve excessive process response issue (232)
  go to next variable
3.4.2.2.2 no:
  pre-select perturbation for next phase—reduced inter-phase size and same direction (502,202)
  resolve excessive process response issue (232)
  go to next variable
3.5 NA:
  intra-cycle process/product disruption review (212)
  RESULTS?
3.5.1 improvement:
  change reference level (222)
  pre-select perturbation for next phase—same size and same direction (226)
  resolve excessive process response issue (232)
  go to next variable (224)
3.5.2 diminution or not significant:
  PERTURBATION ALLOWABLE IN OPPOSITE DIRECTION (WILL NOT VIOLATE A VARIABLE CONSTRAINT)?
3.5.2.1 yes:
  select a new perturbation (2nd)—same size and opposite direction (228)
  resolve excessive process response issue (232)
  intra-cycle process/product disruption review (212)
  RESULT?
3.5.2.1.1 improvement:
  change reference level (222)
  pre-select perturbation for next phase—same size and same direction (226)
  resolve excessive process response issue (232)
  go to next variable (224)
3.5.2.1.2 diminution or not significant:
  pre-select perturbation for next phase—same size and best direction (502, 230)
  resolve excessive process response issue (232)
  go to next variable
3.5.2.2 no:
  pre-select perturbation for next phase—same size and same direction (502,202)
  resolve excessive process response issue (232)
  go to next variable Conclusion, Ramifications, and Scope There has thus been shown and described a novel method of improving manufacturing processes which fulfills all the objects and advantages sought therefor.

Although the above description contains many specificities, these should not be construed as limitations on the scope of the invention, but rather as an exemplification of one preferred embodiment thereof. For example, alternate operation methods for applying the invention can include:

1. An obvious extension of the decision tree would be to portray it as a detailed flowchart that would graphically illustrate the structure of the method including each specific heuristic to be applied.
2. Another obvious extension of the decision tree would be to convert it into an expert system that could be installed on a computer to guide the singular evolutionary operation method. The expert system could be written using a computer programming language or, more easily, by using an expert system shell.
3. Another obvious decision tree extension would be to create textual programmed instruction. This would direct the singular evolutionary operation method just like an expert system except that the guidance would be provided using text rather than a computer.

Many changes, modifications, variations and other uses and applications of the subject invention will, however, become apparent to those skilled in the art after considering this specification and the accompanying drawing which discloses preferred embodiments thereof. All such changes, modifications, variations and other uses and applications which do not depart from the spirit and scope of the invention are deemed to be covered by the invention which is limited only by the claims which follow.

What is claimed is:

1. A manufacturing process improvement method having an evaluation means for identifying the effects of operating variable perturbations on said process in the presence of random process fluctuations, said method comprising the steps of:
   (a) perturbing a single variable from a reference level to an exploratory level to provide a pair of different variable levels;
   (b) replicating said single variable perturbation to provide a cycle of replicated pairs for which said effects can be analyzed using said evaluation means;
   (c) considering all of said single variables sequentially to provide a phase in which said effects of all said single variables have been evaluated;
   (d) a phase issues means for satisfying new said phase functions using new phase heuristics for:
     (1) selecting said variables to be considered,
     (2) handling weak said variables,
     (3) handling discrete-valued said variables,
     (4) recommending initial perturbation size and direction for each said single variable,
     (5) selecting the statistical significance level and replications,
     (6) determining when to transfer all said variables to the contraction stage and recommending a new reduced perturbation size and direction for each said single variable,
     (7) recognizing when the best operating conditions have been reached,
     (8) selecting the sequence in which said variables are to be considered;

(e) a pre-cycle means for satisfying new cycle functions using pre-cycle global cycle heuristics for:
   (1) avoiding the violation of said single variable constraints,
   (2) providing the opportunity for personnel to override recommended said single variable perturbations;
(f) an expansion means for satisfying X, MX, X−, MX−, X+, or MX+ variable classification functions using the intra-cycle global cycle heuristic, expansion stage heuristics, and post-cycle global cycle heuristics for:
   (1) allowing personnel to interrupt said cycle and adjust said single variable perturbation,
   (2) expanding the inter-cycle size of said single variable perturbation within said phase,
   (3) expanding the inter-phase size of said single variable perturbation for next said phase,
   (4) identifying when said single variable becomes bounded and the action to be taken,
   (5) identifying when said single variable becomes enclosed and the action to be taken,
   (6) changing said single variable reference level and the action to be taken,
   (7) changing the direction of said single variable perturbation for the next said cycle within said phase,
   (8) recommending the direction of said single variable perturbation for the next said phase when no significant improvement of said process has been realized,
   (9) reducing the size of said single variable perturbation for the next said phase if any said effect on said process was excessive;
(g) a moderation means for satisfying M variable classification functions using the intra-cycle global cycle heuristic, moderation stage heuristics, and post-cycle global cycle heuristics for:
   (1) allowing personnel to interrupt said cycle and adjust said single variable perturbation,
   (2) recommending the moderation perturbation size and direction for each said single variable,
   (3) recognizing when said single variable should be transferred back to the expansion stage and expanding the size of the transferred said single variable perturbation for the next said phase,
   (4) changing said single variable reference level and the action to be taken,
   (5) changing the direction of said single variable perturbation for the next said cycle within said phase,
   (6) recommending the direction of said single variable perturbation for the next said phase when no significant improvement of said process has been realized,
   (7) reducing the size of said single variable perturbation for the next said phase if any said effect on said process was excessive; and
(h) a contraction means for satisfying C and NA variable classification functions using the intra-cycle global cycle heuristic, contraction stage heuristics, and post-cycle global cycle heuristics for:
   (1) allowing personnel to interrupt said cycle and adjust said single variable perturbation,
   (2) reducing the size of said single variable perturbation for the next said phase when no significant improvement of said process has been realized,
   (3) recognizing when said single variable perturbation is no longer having significant effects on said process,
   (4) changing said single variable reference level and the action to be taken,
   (5) changing the direction of said single variable perturbation for the next said cycle within said phase,
   (6) recommending the direction of said single variable perturbation for the next said phase when no significant improvement of said process has been realized,
   (7) reducing the size of said single variable perturbation for the next said phase if any said effect on said process was excessive,
whereby said method provides that said effects on said process are directly related to each said single variable perturbation,
whereby said method of perturbing only one variable at a time avoids physically impossible or unreasonably difficult combinations of multiple variable levels,
whereby said method is not limited to considering said effects on said process of only a small number of said variables,
whereby said method allows the easy addition and deletion of said single variables, and
whereby said method of moderating any excessive said effect on said process incorporates small changes in the reference levels of said single variables to realize the benefits of favorable variable interactions.

2. The method defined in claim 1, wherein said evaluation means for identifying significant effects of operating variable perturbations on said process comprises the statistical hypothesis testing method for comparing the means of paired observations.

* * * * *